United States Patent [19]
Green

[11] Patent Number: 5,805,793
[45] Date of Patent: Sep. 8, 1998

[54] STAND-ALONE TEST DEVICE FOR TESTING COMMAND-RESPONSE REMOTE TERMINALS

[75] Inventor: Samuel I. Green, St. Louis, Mo.

[73] Assignee: McDonnell Douglas Corporation, St. Louis, Mo.

[21] Appl. No.: 733,769

[22] Filed: Oct. 18, 1996

[51] Int. Cl.⁶ ................................................ G06F 11/00
[52] U.S. Cl. ........................................................ 395/183.08
[58] Field of Search .................... 395/183.01, 183.08, 395/183.13, 183.15, 282, 183.04; 371/24

[56] References Cited

U.S. PATENT DOCUMENTS

| | | | |
|---|---|---|---|
| 3,599,161 | 8/1971 | Stoughton et al. | 395/183.08 |
| 3,764,995 | 10/1973 | Helf, Jr. et al. | 395/183.08 |
| 4,168,527 | 9/1979 | Winkler | 395/183.13 |
| 4,192,451 | 3/1980 | Swerling et al. | 371/20 |
| 4,296,319 | 10/1981 | Franks et al. | 250/227 |
| 4,567,592 | 1/1986 | Minicilli | 395/183.04 |
| 4,622,652 | 11/1986 | Zumchak et al. | 364/900 |
| 4,760,329 | 7/1988 | Andreano | 395/183.08 |
| 4,799,220 | 1/1989 | Nielsen | 371/25 |
| 4,845,712 | 7/1989 | Sanner et al. | 371/25 |
| 4,891,743 | 1/1990 | May et al. | 363/87 |
| 5,051,996 | 9/1991 | Bergeson et al. | 395/183.08 |
| 5,072,447 | 12/1991 | Perloff et al. | 371/20.1 |
| 5,111,402 | 5/1992 | Brooks et al. | 364/424.04 |
| 5,283,781 | 2/1994 | Buda et al. | 370/13.1 |
| 5,291,547 | 3/1994 | Boatwright et al. | 379/113 |
| 5,305,331 | 4/1994 | Sato et al. | 371/29.1 |
| 5,349,578 | 9/1994 | Tatsuki et al. | 370/13 |
| 5,479,610 | 12/1995 | Roll-Mecak et al. | 395/183.01 |
| 5,530,366 | 6/1996 | Nasrallah | 324/547 |
| 5,533,025 | 7/1996 | Fleek et al. | 370/85.2 |
| 5,628,028 | 5/1997 | Michelson | 395/828 |

*Primary Examiner*—Robert W. Beausoliel, Jr.
*Assistant Examiner*—Scott T. Baderman
*Attorney, Agent, or Firm*—Robert Westerlund; Raymond Powell; Westerlund & Powell

[57] ABSTRACT

A stand-alone test device for testing remote terminals intended for use on a command-response data bus which includes a single-purpose electrical waveform generator for generating a coded electrical waveform which is representative of a transmit command sequence which includes an address of a remote terminal under test, an electrical-to-optical converter (e.g., an LED driver and LED) responsive to the coded electrical waveform for producing a first coded optical waveform corresponding to the coded electrical waveform, and an optical transmission line (e.g., an optical fiber) having a first end coupled to the coded optical waveform and a second end coupled to an optical input of the remote terminal under test. The remote terminal under test is responsive to the coded optical waveform for producing an optical output indicative of the operational status of the remote terminal under test. The stand-alone test device further includes an optical-to-electrical converter (e.g., a photodetector and pre-amplifier) responsive to the optical output for producing an output electrical waveform, and an indication device (e.g., or oscilloscope or circuitry that recognizes the presence of data transitions and lights an LED) responsive to the output electrical waveform for producing an indication (e.g., a visual indication) of the operational status of the remote terminal under test.

17 Claims, 2 Drawing Sheets

FIG.2A BIT TIMES | 1 2 3 4 5 6 7 8 9 10 11 12 13 14 15 16 | 1 2 3 4 5 | 6 7 8 9 10 | 11 12 13 14 15 | 16 17 18 19 20 |
| PREAMBLE | SYNCH | RT ADDRESS | T/R | SUB-ADDRESS | WORD COUNT | PARITY |

START OF SEQUENCE →

FIG.2B PREAMBLE ⎍⎍⎍⎍⎍⎍⎍⎍⎍⎍⎍⎍⎍⎍⎍⎍

FIG.2C COMMAND WORD SYNCH ⎍

FIG.2D RT ADDRESS |1|1|0|1|1|0|1|1| ⎍⎍⎍⎍   ALL FIVE ADDRESS BITS PROGRAMMABLE

FIG.2E T/R SET TO 1 FOR TRANSMIT ⎍

FIG.2F SUBADDRESS SET TO 00001 |0|0|0|0|0|1| ⎍⎍⎍

FIG.2G WORD COUNT |0|0|0|0|1|0| ⎍⎍ 2 WORDS   OR   |0|0|0|0|0|0| ⎍⎍⎍⎍⎍ 32 WORDS   BY PROGRAMMING BIT 18

← END OF SEQUENCE

FIG.2H ODD PARITY ⎍   PARITY 0 OR 1 COMPUTED BY STATE MACHINE

STAND-ALONE TEST DEVICE FOR TESTING COMMAND-RESPONSE REMOTE TERMINALS

BACKGROUND OF THE INVENTION

The present invention relates generally to diagnostic test equipment for testing remote terminals built for use on a command-response data bus, and more particularly, to a stand-alone test device for testing the operational status of command-response remote terminals while disconnected from the command-response data bus.

Systems in which a plurality of remote terminals (RTs) are coupled to a system computer via a command-response data bus are presently available. For example, such systems are used in military aircraft to couple a flight control computer to a plurality (e.g., 8–16) of individually addressable RTs via a high-speed electrical or fiber-optical data bus. The three most common types of command-response data bus are: (1) the MIL-STD-1553 electrical data bus, which is a 1 Megabit per second (Mbps) data bus; (2) the MIL-STD-1773 fiber-optical data bus, which is a 1 Mbps data bus; and, (3) the SAE AS 1773 fiber-optical data bus, which is a 20 Mbps data bus.

The typical RT is incorporated into a sensor or an actuator to implement a data bus communication node. The RT is passive and gives no indication of operability until it receives a suitable command from a bus controller (BC). At present, diagnostic testing of RTs on a command-response data bus is performed using diagnostic test equipment which includes a computer provided with a BC. In this connection, the BC is typically an after-market board which is installed in the diagnostic computer. This diagnostic test equipment is quite expensive, but provides the capability to use the data bus to its full capability, as well as performing complex diagnostics of the RTs. In some instances, it is only necessary to test the RTs quickly to determine their operational status, e.g., whether they are functional and able to respond correctly to simple stimuli. Thus, there presently exists a need in the art for a much less expensive, stand-alone test device which is capable of quickly testing RTs on a command-response data bus in order to determine their operational status. The present invention fulfills this need in the art.

SUMMARY OF THE INVENTION

The present invention encompasses a stand-alone test device for testing command-response data bus remote terminals connected to or disconnected from the command-response data bus. The stand-alone test device includes a single-purpose electrical waveform generator for generating a coded electrical waveform which is representative of a command sequence, e.g., a transmit command sequence, which includes an address of a remote terminal under test, an electrical-to-optical converter (e.g., an oscilloscope or circuitry that recognizes the presence of data transitions and lights an LED) responsive to the coded electrical waveform for producing a first coded optical waveform corresponding to the coded electrical waveform, and an optical transmission line (e.g., an optical fiber) having a first end coupled to the coded optical waveform and a second end coupled to an optical input of the remote terminal under test.

The remote terminal under test is responsive to the coded optical waveform for producing an optical output indicative of the operational status of the remote terminal under test. The stand-alone test device further includes an optical-to-electrical converter (e.g., a photodetector and pre-amplifier) responsive to the optical output for producing an output electrical waveform, and an indication device (e.g., an LED or oscilloscope) responsive to the output electrical waveform for producing an indication (e.g., a visual indication) of the operational status of the remote terminal under test.

The coded optical waveform, in a preferred embodiment, emulates an optical transmit command waveform representative of a transmit command sequence normally generated by a bus controller in a diagnostic computer. The transmit command sequence, in the preferred embodiment, includes a preamble portion, a synchronization portion, a remote terminal address portion which selects the address of the remote terminal under test, a transmit/receive bit which instructs the remote terminal under test to transmit a status word followed by data words or to invoke a receive mode of operation, dependent upon its logic level, a subaddress portion which indicates a starting address within a dual-port memory of the remote terminal under test from which data to be transmitted by the remote terminal under test is to be retrieved, a word count portion which indicates the number of data words to be transmitted by the remote terminal under test, and a parity bit.

In another of its embodiments, the present invention encompasses a stand-alone test device for testing command-response data bus remote terminals either connected to or disconnected from the command-response data bus which includes an electrical waveform generator for generating a coded electrical waveform which is representative of a transmit command sequence which includes an address of a remote terminal under test. The remote terminal under test is responsive to the coded electrical waveform for producing an output electrical waveform indicative of the operational status of the remote terminal under test. A visual indication device responsive to the output electrical waveform produces a visual indication of the operational status of the remote terminal under test. The stand-alone test device in accordance with this embodiment does not utilize electrical-to-optical and optical-to-electrical converters.

BRIEF DESCRIPTION OF THE DRAWINGS

These and various other features and advantages of the present invention will be more clearly understood from the following detailed description read in conjunction with the accompanying drawings, in which.

DETAILED DESCRIPTION OF THE INVENTION

Figure 1:
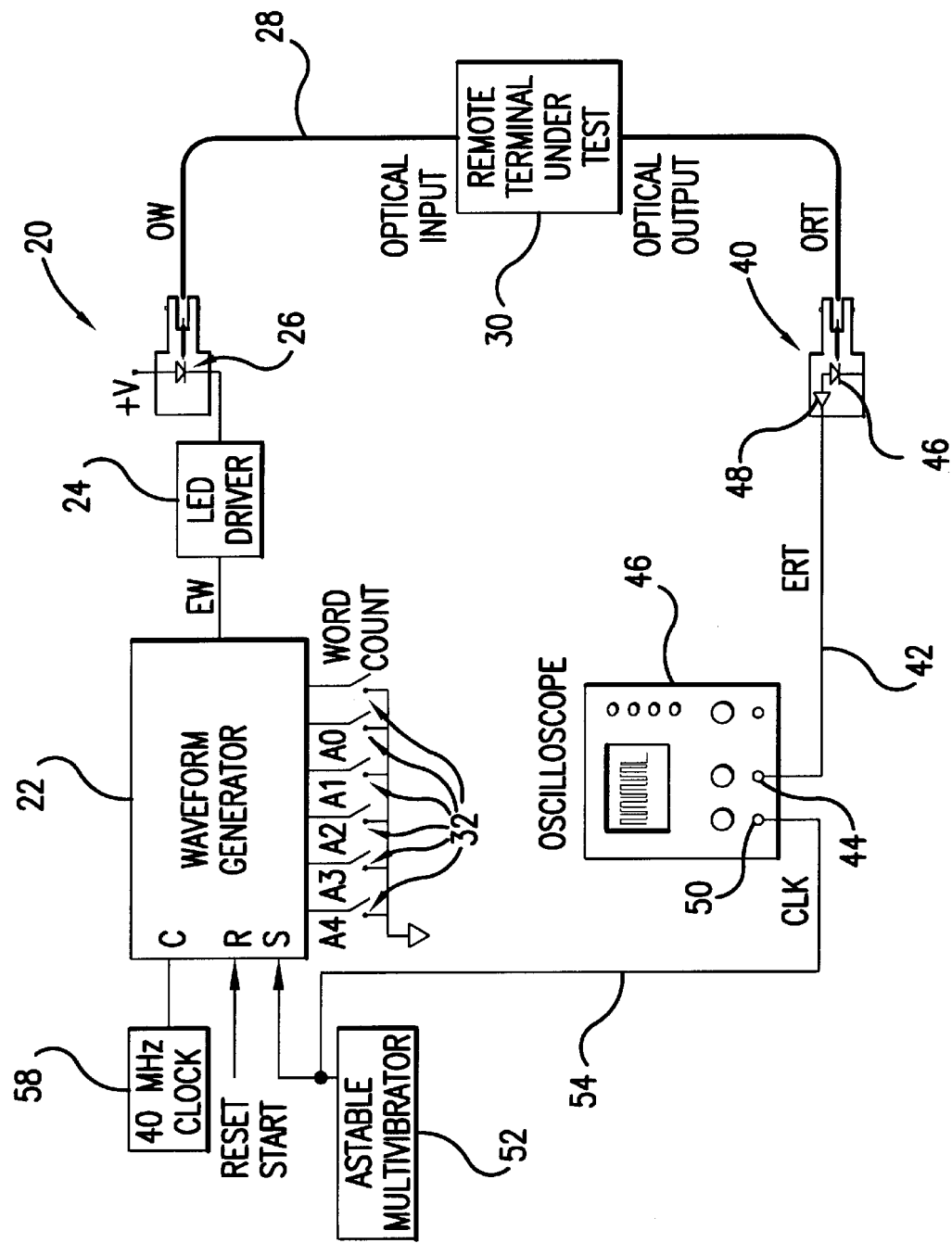
FIG. 1 is a block diagram of a stand-alone test device constructed in accordance with a preferred embodiment of the present invention; and, FIGS. 2A–2H depict the data structure (or bit pattern) of a test waveform generated by the stand-alone test device depicted in FIG. 1.

While the present invention is described herein with reference to a presently preferred embodiment for a particular application, it should be clearly understood that the present invention is not limited thereto. Those having ordinary skill in the art and access to the teachings provided herein will recognize additional modifications, applications, and embodiments of the present invention, and additional fields in which the present invention would be of significant utility, without departing from the spirit and scope of the present invention.

In overview, the present invention encompasses a stand-alone test device for testing remote terminals (RTs) connected to or disconnected from a command-response data bus. The stand-alone test device stimulates the RT to evoke a response by sending an optical transmit command waveform heretofore generated by the more expensive diagnostic test equipment.

With reference now to FIG. 1, there can be seen a block diagram of a stand-alone test unit 20 which constitutes a preferred embodiment of the present invention. The stand-alone test unit 20 includes an electrical waveform generator 22 which is configured to generate a coded electrical waveform Ew identical to a transmit command (test waveform) issued by a BC in a computer in accordance with the data message protocol for an SAE AS 1773 optical data bus. In a working prototype of the stand-alone test unit 20, the electrical waveform generator 22 was implemented by programming a field-programmable logic array (FPLA) to serve as a state machine for synthesizing the electrical waveform Ew.

The electrical waveform Ew generated by the waveform generator 22 is applied to the input of a Light Emitting Diode (LED) driver 24. The output of the LED driver 24 is coupled to an LED 26. Thus, the electrical waveform Ew modulates the optical output of the LED 26, to thereby produce a coded optical waveform Ow which is coupled over an optical fiber 28 to an optical input of a remote terminal (RT) 30 under test. Thus, the coded optical waveform Ow is an optical replica of the electrical waveform Ew. It will be readily appreciated by those skilled in the pertinent art that any suitable electrically modulatable optical source (i.e., electrical-to-optical converter) can be used in place of the LED 26. In the prototype unit, a 1300 nm LED was employed.

In the working prototype of the stand-alone test unit 20, the transmit command sequence has a data structure as depicted in FIGS. 2A–2H, in accordance with the SAE AS 1773 databus message protocol. As can be seen in FIGS. 2A–2H, the transmit command sequence includes:

a) a sixteen (16) bit preamble which permits the local clock to synchronize with the burst of data—the portion of the electrical waveform Ew corresponding to the preamble of the transmit command word is illustrated in FIG. 2B (note that preamble length is normally programmable and need not be 16 bits long to function properly);

b) a three (3) bit period illegal Manchester code command word synchronization block ("synch"), which signifies to the RT 30 under test the beginning of a command word—the portion of the electrical waveform Ew corresponding to the synch block of the transmit command sequence, which constitutes the first three bit periods of the transmit command word, is illustrated in FIG. 2C;

c) a five (5) bit RT address, which selects the address of the RT 30 under test—the portion of the electrical waveform Ew corresponding to the RT address portion of the transmit command sequence, which constitutes bits 4–8 of the transmit command word, is illustrated in FIG. 2D;

d) a transmit/receive (T/R) bit, which is set to logic 1 to instruct the RT 30 under test to transmit a status word and data words in response to the transmit command word—the portion of the electrical waveform Ew corresponding to the T/R bit of the transmit command sequence, which constitutes bit 9 of the transmit command word, is illustrated in FIG. 2E;

e) a five (5) bit subaddress, which constitutes the pointer to a starting address in the dual-port memory (not shown) of the RT 30 under test from which data to be transmitted by the RT 30 under test is to be retrieved—the portion of the electrical waveform Ew corresponding to the subaddress portion of the transmit command sequence, which constitutes bits 10–14 of the transmit command word, is illustrated in FIG. 2F;

f) a five (5) bit word count block, which indicates the number (from 1–32) of data words to be transmitted by the RT 30 under test in response to the transmit command word—the portion of the electrical waveform Ew corresponding to the word count block of the transmit command sequence, which constitutes bits 15–19 of the transmit command word, is illustrated in FIG. 2G; and, g) a parity bit, which indicates odd or even parity, and which is tested by the RT 30 under test to detect erroneous commands—the portion of the electrical waveform Ew corresponding to the parity bit of the transmit command sequence, which constitutes bit 20 of the transmit command word, is illustrated in FIG. 2H.

A plurality of discrete switches 32 (e.g., DIP switches) are connected to respective inputs of the waveform generator 22 in order to enable a user to program (i.e., manually select) the logic level of corresponding bits of the transmit command word represented by the electrical waveform Ew. More particularly, the switches 32 coupled to inputs A4–A0 of the waveform generator 22 are used to program the 5-bit RT address of the RT 30 under test, and the switch 32 coupled to the "word count" input of the waveform generator 22 is used to set the logic level ("0" or "1") of the fourth bit of the word count block of the transmit command word (i.e., bit 18 of the transmit command word), as can be seen in FIG. 2G, to thereby set the word count value to either 32 words or 2 words.

It should be understood that the present invention, in its broadest aspect, does not require that any provision be made for selective adjustment of the word count value, since the number of data words returned by the RT 30 under test is unimportant in determining whether or not the RT 30 under test is operative ("alive"). However, in order to enable easy and rapid observation of the return data, the switch 32 coupled to the word count input of the waveform generator 22 is preferably provided, to thereby enhance the utility of the stand-alone test device 20 in determining the operational status of the RT 30 under test.

It should also be understood that since the actual data returned by the RT 30 under test is unimportant with respect to testing the operational status thereof, the subaddress value is also unimportant with respect to testing the operational status of the RT 30 under test. Thus, for sake of simplicity and ease of implementation, the prototype unit used a fixed subaddress value of "00001".

With reference again to FIG. 1, in response to the coded optical waveform Ow (i.e., the transmit command sequence) received at its optical input, the RT 30 under test transmits a preamble, a status word, and 2 or 32 data words retrieved from its memory (starting at the subaddress designated by the transmit command word), as a coded optical waveform Ort, over an optical fiber 38 whose distal end is coupled to a photodetector 40, which converts the coded optical waveform Ort to a corresponding electrical waveform Ert which is applied via line 42 to a signal input 44 of an oscilloscope 46. It will be readily appreciated by those skilled in the pertinent art that any suitable optical-to-electrical converter can be employed in place of the photodetector 40. In the prototype unit, a photodetector 40 comprised of an InGaAs photodiode 46 suitable for operation at 1300 nm coupled to a pre-amplifier 48 was employed.

A clock input 50 of the oscilloscope 46 is coupled to a 50 Hz—1 kHz output CLK of an astable multivibrator 52 via a line 54. It will be appreciated by those skilled in the pertinent art that the frequency of the output of the astable multivibrator 52 which is selected is not limiting to the present invention. The output CLK of the astable multivibrator 52 is also applied over a line 56 to a start input S of the waveform generator 22. The waveform generator 22 also has a reset input R coupled to a manual or power-on reset signal "Reset", and a clock input C coupled to a suitable clock generator, e.g., a 40 MHz clock 58 in the case of an SAE AS 1733 command-response data bus. It will also be readily apparent to those skilled in the pertinent art that the electrical-to-optical converter and the optical-to-electrical converter are not necessary when the present invention is employed in conjunction with an electrical command-response data bus, e.g., the MIL-STD-1553 command-response data bus, in which case electrical transceivers are substituted, and the clock 58 becomes a 2 MHz clock.

When it is desired to test a RT in order to determine its operational status, the stand-alone test unit 20, which is portable, is set up for the test operation by coupling the optical fiber 28 to the serial optical input port of the RT 30 under test and by coupling the optical fiber 38 to the serial optical output port of the RT 30 under test. The power is then turned on, and the waveform generator 22 is either automatically or manually reset. The user/operator programs into the waveform generator 22 the address of the RT 30 under test by selectively opening or closing the appropriate switches 32 coupled to the address inputs A0–A4 of the waveform generator 22, and selects the number of data words (2 or 32) to be returned by the RT 30 under test by selectively opening or closing the switch 32 coupled to the "word count" input of the waveform generator 22. The waveform generator 22 automatically generates the coded electrical waveform Ew, which, in turn, modulates the optical output of the LED 26, to thereby produce the coded optical waveform Ow (i.e., the transmit command sequence described hereinabove).

The coded optical waveform Ow instructs the RT 30 under test to transmit a status word and a number of data words specified by the word count value of the transmit command sequence. The status and data words are transmitted by the RT 30 under test as a coded optical waveform Ort over the optical fiber 38, which is converted into a corresponding electrical waveform Ert which is applied via the line 42 to the signal input 44 of the oscilloscope 46. The oscilloscope 46 provides a visual display of the electrical waveform Ert for observation by the user/operator. The presence of the displayed waveform confirms that the RT 30 under test is operative ("alive"), and the displayed waveform can be examined by the user/operator to determine whether the address bits of the status word transmitted by the RT 30 under test matches the expected RT address and whether the status word indicates the presence of any consistent errors. Thus, the stand-alone test device 20 provides the capability of simply and rapidly testing remote terminals in order to determine their basic operational status.

Although a presently preferred embodiment of the present invention has been described in detail hereinabove, it should be clearly understood that many variations and/or modifications of the basic inventive concepts herein taught which may appear to those skilled in the pertinent art will still fall within the spirit and scope of the present invention as defined in the appended claims. For example, circuitry that recognizes the presence of data transitions and lights an LED or other indicator device could be used in place of an oscilloscope to provide a simple visual and/or other (e.g., audio) annunciation of the presence of the return signal indicating the operational status of the RT under test.

What is claimed is:

1. A stand-alone, non-computer-controlled test device for testing a remote terminal which is connectible to a command-response data bus, comprising:

a single-purpose electrical waveform generator for generating a coded electrical waveform which is representative of a command sequence which includes an address of a remote terminal under test;

an electrical-to-optical converter responsive to said coded electrical waveform for producing a first coded optical waveform corresponding to said coded electrical waveform;

a first optical transmission line having a first end coupled to said coded optical waveform and a second end coupled to an optical input of the remote terminal under test, wherein the remote terminal under test is responsive to said coded optical waveform for producing an optical output indicative of the operational status of the remote terminal under test;

an optical-to-electrical converter responsive to said optical output for producing an output electrical waveform; and, an indication device responsive to said output electrical waveform for producing an indication of the operational status of the remote terminal under test;

wherein the test device and the remote terminal under test are both disconnected from the command-response data bus; and, wherein said coded electrical waveform comprises an emulation of a transmit command waveform normally generated by a bus controller in accordance with a prescribed protocol.

2. The test device as set forth in claim 1, further comprising a plurality of discrete switches coupled to respective inputs of said electrical waveform generator for enabling a user to program manually the address of the remote terminal under test.

3. The test device as set forth in claim 1, further comprising a second optical transmission line having a first end coupled to said optical output and a second end coupled to said indication device.

4. The test device as set forth in claim 3, wherein said indication device includes a light emitting means responsive to said output electrical waveform for producing a visual indication of the operational status of the remote terminal under test.

5. The test device as set forth in claim 3, wherein said indication device includes an oscilloscope responsive to said output electrical waveform for producing a visual display of said output electrical waveform, wherein the operational status of the remote terminal under test can be determined by observation of said visual display.

6. The test device as set forth in claim 1, wherein the command sequence comprises a transmit command sequence which further includes a word count bit-field.

7. The test device as set forth in claim 6, further comprising at least one discrete switch coupled to a respective input(s) of said electrical waveform generator for enabling a user to manually program the value of the word count bit-field.

8. The test device as set forth in claim 6, wherein the word count bit-field instructs the remote terminal under test to output a number of words of data dependent upon the value of the word count bit-field.

9. The test device as set forth in claim 8, further comprising at least one discrete switch coupled to a respective input(s) of said electrical waveform generator for enabling a user to manually program the value of the word count bit-field.

10. The test device as set forth in claim 1, wherein said optical-to-electrical converter includes a photodetector.

11. The test device as set forth in claim 1, wherein the command sequence comprises a transmit command sequence which includes:

a preamble portion;

a synchronization portion;

a remote terminal address portion which selects the address of the remote terminal under test;

a transmit/receive bit which instructs the remote terminal under test to transmit a status word and data words or to invoice a receive mode of operation, dependent upon its logic level;

a subaddress portion which indicates a starting address within a dual-port memory of the remote terminal under test from which data to be transmitted by the remote terminal under test is to be retrieved;

a word count portion which indicates the number of data words to be transmitted by the remote terminal under test; and, a parity bit.

12. The test device as set forth in claim 1, wherein said electrical-to-optical converter includes an LED.

13. The test device as set forth in claim 3, wherein each of said first and second optical transmission lines comprises an optical fiber.

14. The test device as set forth in claim 1, wherein said electrical waveform generator comprises a field-programmable logic array programmed to serve as a state machine for synthesizing said coded electrical waveform.

15. A stand-alone, non-computer-controlled test device for testing a remote terminal which is connectible to a command-response data bus, comprising:

a single-purpose electrical waveform generator for generating a coded electrical waveform which is representative of a command sequence which includes an address of a remote terminal under test, wherein the remote terminal under test is responsive to said coded electrical waveform for producing an output electrical waveform indicative of the operational status of the remote terminal under test; and, an indication device responsive to said output electrical waveform for producing an indication of the operational status of the remote terminal under test;

wherein the test device and the remote terminal under test are both disconnected from the command-response data bus; and, wherein said coded electrical waveform comprises an emulation of a transmit command waveform normally generated by a bus controller in accordance with a prescribed protocol.

16. The test device as set forth in claim 15, further comprising means for enabling a user to program manually the address of the remote terminal under test.

17. The test device as set forth in claim 15, wherein the command sequence comprises a transmit command sequence which includes:

a preamble portion;

a synchronization portion;

a remote terminal address portion which selects the address of the remote terminal under test;

a transmit/receive bit which instructs the remote terminal under test to transmit a status word and data words or to invoke a receive mode of operation, dependent upon its logic level;

a subaddress portion which indicates a starting address within a dual-port memory of the remote terminal under test from which data to be transmitted by the remote terminal under test is to be retrieved;

a word count portion which indicates the number of data words to be transmitted by the remote terminal under test; and, a parity bit.

* * * * *